Oct. 23, 1945. O. J. LINK 2,387,276
CREAM CHEESE MANUFACTURE
Filed Oct. 8, 1942 2 Sheets-Sheet 1
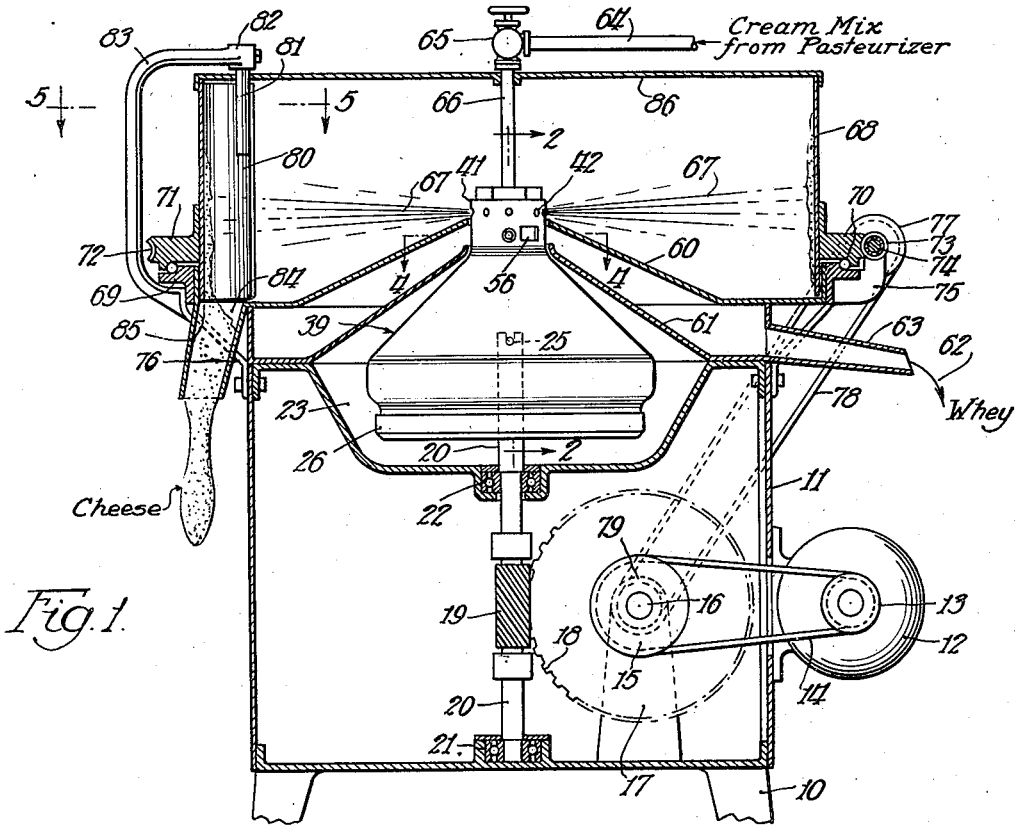
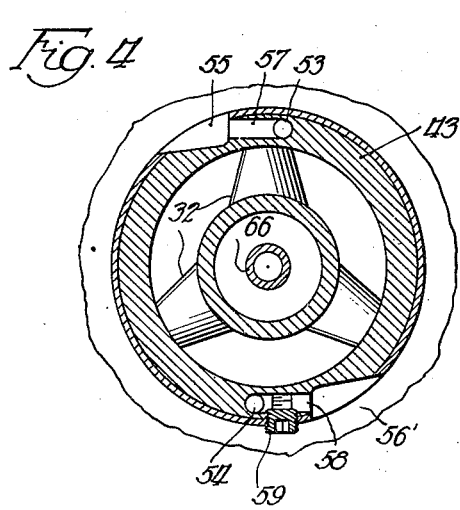
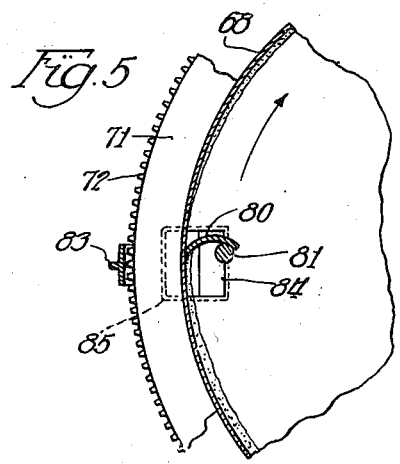
Inventor
Oscar J. Link
By Soans, Pond & Anderson, Attys.

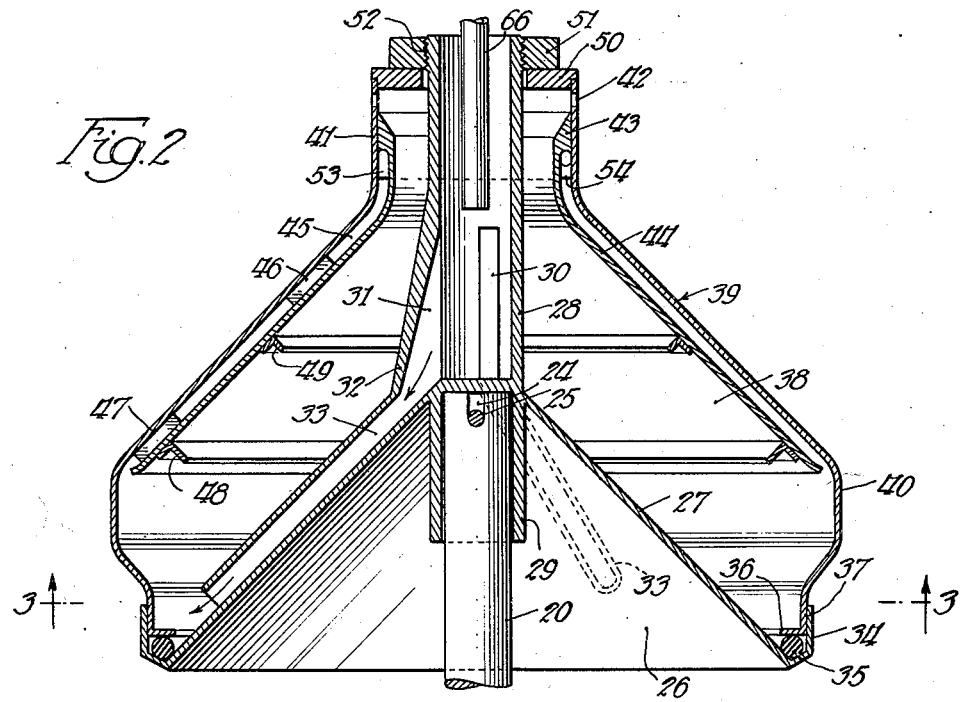
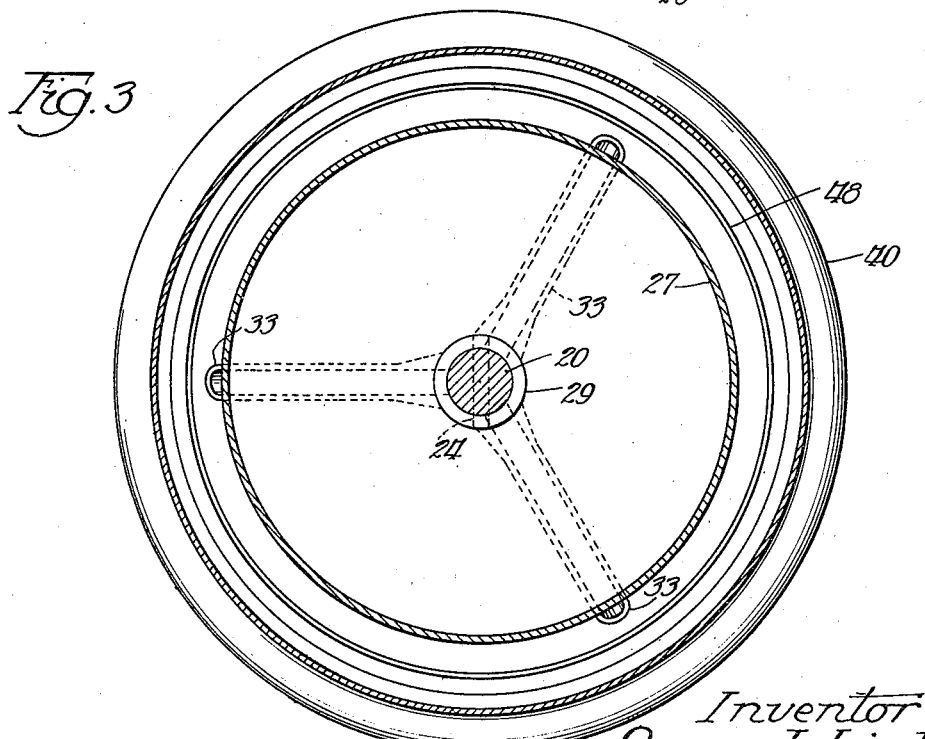

Patented Oct. 23, 1945

2,387,276

UNITED STATES PATENT OFFICE 2,387,276

CREAM CHEESE MANUFACTURE

Oscar J. Link, Beaver Dam, Wis., assignor to Kraft Cheese Company, a corporation of Delaware Application October 8, 1942, Serial No. 461,348

3 Claims. (Cl. 99—116)

The invention relates to improvements in cream cheese manufacture and relates to an improvement in that part of the procedure which follows the making of the ripened mix and includes the draining of the whey from the ripened mix and the packaging of the solid cheese.

According to the most generally accepted procedure in the manufacture of cream cheese, it is customary to add to sweet cream as the principal base sufficient sweet milk or skim milk, as the case may be, to make a mix of the desired butter fat content, for example from 7% butter fat to as much as 20% of butter fat, depending upon the richness which is desired in the final product.

It is also the general practice to pasteurize the mix after which it is homogenized and cooled to the setting temperature, usually between 62° F. and 80° F. To the cooled mix, there is added a lactic acid starter or other suitable culture which will develop the correct flavor and acidity, and the mix is held at the setting temperature for a sufficient length of time, say from eight to eighteen hours, until sufficient acidity has developed in the whey. For example, a whey acidity of 0.7 to 0.9% is frequently found to exist when the batch has reached a condition where separation takes place between the curd and the whey and where the proper flavor has been developed. In this condition, the mix may be said to be properly ripened.

According to the old practice, the mix is then introduced into filter bags which are placed in a medium of relatively low temperature, slightly above the freezing point, and the whey is permitted to drain through the bags by gravity. Usually about twenty-four hours is required for the draining operation, before the cheese has lost sufficient whey to meet the desired standards, which, for ordinary cream cheese, are in excess of 33% milk fat and less than 55% moisture.

Having arrived at the desired moisture per cent condition, the cheese is usually packaged by enclosing same in suitable wrappers or containers. The usual run of cream cheese prepared according to these conditions, if kept under proper conditions as to temperature, will maintain its flavor and freshness for about ten days.

The principal objects of the present invention are to provide a method of curd draining and packaging which can be carried out as a continuous operation and which will practically eliminate the long-drawn-out twenty-four hour draining step employed in the old filter bag method and which will enable the cheese to be packaged in a relatively much more sterile condition and under more aseptic conditions than in the case of prior methods. Further objects of the invention are to provide an economical and efficient method of manufacturing cream cheese, and to obtain a more palatable, sterile and less perishable product.

I have succeeded in attaining all of the aforesaid objects by subjecting the usual ripened cheese mix to a procedure and by means of equipment which will now be described.

In the accompanying drawings which illustrate an improved type of equipment which has been successfully used in carrying out the improved procedure:

Fig. 1 is a vertical section through a piece of equipment by which the separating is effected;

Fig. 1 is an enlarged section taken on the line 2—2 of Fig. 1;

Fig. 3 is a section taken on the line 3—3 of Fig. 2;

Fig. 4 is an enlarged section taken on the line 4—4 of Fig. 1; and

Fig. 5 is a section taken on the line 5—5 of Fig. 1.

According to the improved procedure, ripened mix prepared according to the old and accepted methods used in the manufacture of cream cheese, and as I have described it above, is heated to a sufficient temperature and for a sufficient length of time to bring about a condition at which separation can be readily effected when the material is mechanically treated in the proper equipment. This temperature may be as high as 170° F., it being understood that any temperature which does not materially affect the flavor or other characteristics of the product may be used, or it can be as low as about 135° F. In any case, the temperature used should be high enough to break the viscosity of the mix. It is also advisable to arrange matters so that the material is heated sufficiently, so that the heat treatment of the cheese will be effective not only to fit the material for mechanical separation, but will also serve in effect to pasteurize the product.

In order to obtain the benefit of the heat treatment, the material is treated in a special mechanical separator while still in a heated condition, and, after sufficient whey has been removed, the product is immediately packaged while still kept at an elevated temperature. In this way, the packages are rendered sterile by the heat of the material which is placed therein, and, if the packages are closed or sealed while at that elevated temperature, there will be virtually no opportunity for deleterious organisms to contaminate the product prior to shipment.

Although other means of mechanical separation, and although other types of apparatus perhaps may be employed, I have obtained excellent results by the use of a continual mechanical separator such as is disclosed in the drawings. This apparatus is a well-known make of mechanical cream separator of the centrifugal type, which has been modified to adapt it for separating a relatively solid material such as cream cheese instead of liquid cream.

Referring to the drawings, it will be seen that the machine is equipped with the usual standard or legs 10 upon which there is carried the main frame element or housing 11. The machine is operated by a suitable fractional horse power motor 12 which, by means of a pulley 13 and V-pulley 14, drives a pulley 15 fixed on a counter-shaft 16. Counter-shaft 16 is mounted in suitable spaced horizontal bearings not shown, and on said shaft there is also keyed a worm wheel 17 the teeth 18 of which mesh with the threads of a multi-thread screw or worm 19 which is drivingly mounted on the axially vertical spinner shaft 20. The spinner shaft 20 is rotatably mounted in suitable high-speed ball bearings 21 and 22 carried in suitable pockets of the main housing 11, and extends upwardly above bearing 22 into the spinner chamber 23 of the separator. The upper end of the spinner shaft 20, as shown best in Fig. 2, is made with a transverse slot or key-way 24 large enough to receive the diameter of the driving pin 25 of the spinner.

The spinner is composed of inner and outer principal elements, both generally conical in shape. The inner spinner element 26 comprises an inverted cone of sheet metal 27 the upper end of which is integrally joined to a quill 28 having a lower extension 29 which extends down over and fits the spinner shaft 20. In said upper extension 29, there is secured the diametric driving pin 25 previously referred to.

The upper end of the quill 28 is made with a series of three circumferentially spaced slots, for example 30, which serve as openings into the downwardly extending inclined ducts 31. The enlargements 32 formed on the quill 28 close the ducts 31 except at their lower ends where said ducts 31 communicate with the upper ends of the inclined tubes 33 which extend down almost to the lower end of the cone 27.

The lower end of the cone 27 is formed with a reversely bent flange 34 which provides an enclosure for a rubber sealing ring 35 upon which the sealing flange 36 of the upper or outer spinner is seated, the lower end 37 of said outer spinner fitting within the said upturned flange 34.

The outer or upper element of the spinner comprises as its principal element an umbrella-shaped hood 38 having an upper conical section 39 and a more or less cylindrical lower end part 40 which is reduced in diameter at its lower end to form the cylindrical flange 37 previously referred to. At its upper end, the conical section 39 is extended upwardly in the form of a cylindrical part 41 which, at its upper end adjacent the margin thereof, is perforated with a series of from eight to a dozen holes 42, through which holes the solid material or cheese is projected outwardly by centrifugal force.

To the inside of the cylindrical part 41 of the outer spinner, there is integrally united a relatively thick ring 43 to the lower end of which at the inside edge thereof there is integrally united an inner shield part 44 which takes the form of a cone following down the inside of the cone 39 and spaced therefrom as indicated at 45 in order to form a passageway for the whey as it is forced upwardly by the centrifugal action. Said spacing of the outer cone 9 on the inner conical shield 44 is maintained by upper and lower sets of spacer blocks or discs 46 and 47 distributed around the periphery of the spinner. Also, in order to retard the upward flow of the lighter material along and up the inside surface of the conical shield 44, it is advisable to use a mild baffling means which, in the present case, takes the form of a lower circumferential flanged angle piece 48, and, if desired, another similar somewhat smaller angle piece 49 can be located higher up on the inside of the shield.

The upper end of the outer spinner 39 is held in central position by a ring or disc 50 the inner diameter of which fits the outer diameter of the quill 28 while the outer edge of said ring 50 is made with a rabbet to snugly receive the upper end of the cylindrical extension 41. The entire assemblage is clamped together by a ring nut 51 which is threaded onto the upper end of the quill 28, as shown at 52. Means must be provided to permit escape of the whey which by the centrifugal action is forced up the spinner through the space 45 between the outer conical section 39 and the inner conical shield 44. In the present instance, such whey is permitted to escape through a pair of openings one of which is provided with an adjustment.

As shown best in Fig. 2 and Fig. 4, there are a pair of holes 53 and 54 drilled upwardly into the connector ring 43 and, as shown best in Fig. 4, there are a pair of recesses 55 and 56 formed in the outside of the cylindrical part of the combined structure. These recesses 55 and 56 are connected to the upper ends of the apertures 53 and 54 by means of tangential ducts 57 and 58. In order to obtain some measure of adjustment of the flow of whey through the exits just described, one of them is provided with a valve, which in the present instance takes the form of a set screw 59, threaded into a diametric tapped hole extending from the outside of the cylindrical member 42 into the tangential duct 58. By screwing the set screw 59 in or out, the duct 58 can be restricted or enlarged as desired.

In order to separate the flow of whey from the flow of cheese or curd, the whey is caught in the space between a pair of circular more or less conical upper and lower canopies 60 and 61, the upper edge of the lower canopy 61 being set slightly below the level of the whey openings 56 and 57 while the upper edge of the upper canopy 60 is located between the said openings 56 for the whey and the exit openings 42 for the cheese. The space between the canopies 60 and 61 is sealed so as to make a single combined hollow structure which is secured to the top of the outer housing or casing 11 in any suitable manner, and in order to discharge the whey 62 a spout 63 is provided. The flow of the ripened mix as it comes from the pasteurizer enters a horizontal supply pipe 64 and through a valve 65 flows into the spinner through the inlet pipe 66.

Means are provided to catch the solid cheese or curd as it is ejected from the holes 42 in the upper end of the spinner. As shown in Fig. 1, the material is ejected in a horizontal direction as indicated at 67 and is prevented from flying out into the atmosphere by means of cylindrical receiver 88, from the inside of which it may be scraped from time to time as it accumulates. If desired, the scraping may be made automatic. For example, the receiver 68 can be supported to rotate upon a stationary track ring 69 with or without a set of anti-friction balls 70 between said ring 69 and flange ring 71 secured to the outside of the receiver 68. The ring part 71 of the rotary receiver 68 takes the form of a worm gear having teeth 72 which are engaged by a worm 73 on a shaft 74 arranged to rotate in bearings on a suitable bracket 75 secured to the stationary ring 69 while the ring 69 in turn is supported on the housing 11 by means of brackets 76. Shaft 74 is driven at a suitable speed by a pulley 77, V-pulley 78 and pulley 79 keyed to the shaft 16 previously referred to as being driven by the motor 12, so that, when the machine is operating, the receiver 68 will be slowly rotated around the vertical axis of the machine.

For the purpose of automatically removing the solid material from the inside of the rotating receiver cylinder 68, I can employ a curved scraper or plow 80 secured to a depending shaft or rod 81 the axis of which is parallel with the shaft of the machine and having its upper end rotatably adjustable in the head 82 of a bracket or standard 83 supported by a fixed part of the machine frame. Immediately below, but slightly in front of the scraper 80, there is provided an opening 84 in the upper canopy 60, said opening leading to a spout 85 through which the material is delivered as it is scraped off the receiver. A flanged cover plate 86 may be secured to the under side of valve 65 or pipe 66 in order to prevent dissipating of material and to keep the cheese free from contamination and to maintain it at the right temperature while it is undergoing separation.

In view of the above explanation, it will not be necessary to describe the operation of the machine in detail. It will be understood, of course, that, as the cream mix flows in through the pipe 66, it will pass through the openings 32 through the three pipes 33 to the bottom of the spinner, whereupon it will be subjected to centrifugal force resulting from a speed of some 10,000 R. P. M. As a result, the heavier whey will be forced to the outside of the spinner, while the relatively lighter solid cream constituents will move inwardly. In view of the fact that there is a constant supply of material through the pipe 66, the only way for the cream and the whey to escape is by moving upwardly in the spinner. Hence the whey will move upwardly through the space 45 and out through the apertures 53 and 54, while the cream solids will move upwardly on the inside of the shield 44 and will pass out through the openings 42.

In view of the fact that there will be a considerable flow of material and that the cheese is almost completely enclosed in a more or less heated medium while it is being separated from the whey, the pasteurized condition of the cheese will be maintained, and there will be little chance for contamination, especially in view of the fact that, as shown diagrammatically in Fig. 1, the cheese (still heated), when it passes out of the delivery spout 85, can be introduced directly into the filling equipment and thence into the shipping packages. Thus there is no opportunity for the cheese to become contaminated with deleterious living organisms.

The scope of the invention should be determined by reference to the appended claims.

I claim:

1. The improvement in the art of making packages of cream cheese, which consists in preparing a ripened liquid cream mix, heating the ripened mix to a temperature of between 135° and 170° F., centrifuging the solids from the whey while the material is still at a temperature above 135° F., and then packaging the separated solids.

2. The improvement in the art of manufacturing cream cheese from a properly ripened liquid mix which has sufficient acidity to enable the curd to separate from the whey, which consists in raising the temperature of the mix sufficiently to break the viscosity of the mix, then centrifuging the material so as to separate sufficient whey from the solids to reduce the moisture content of the cheese to the prescribed legal limit, while substantially maintaining said temperature, and then packaging the cheese.

3. The improvement in the art of manufacturing cream cheese which consists in preparing the liquid mix, raising the acidity and lowering the viscosity thereof sufficiently to enable the curd to be separated from the whey, then raising the temperature of the mix to at least 135° F. so as to effect coagulation of the curd, then promptly centrifuging the mix at substantially said elevated temperature to remove sufficient whey to reduce the moisture content of the cheese to the prescribed legal limit, and then packaging the cheese.

OSCAR J. LINK.